United States Patent
Suzuki et al.

(10) Patent No.: US 9,096,217 B2
(45) Date of Patent: Aug. 4, 2015

(54) CONTROL APPARATUS FOR TRANSMISSION, AND CONTROL METHOD FOR TRANSMISSION

(75) Inventors: Takehiko Suzuki, Toyota (JP); Tomonori Tsugo, Nishio (JP); Yukio Sugiura, Hekinan (JP)

(73) Assignee: AISIN AW CO., LTD., Anjo (JP)

( * ) Notice: Subject to any disclaimer, the term of this patent is extended or adjusted under 35 U.S.C. 154(b) by 58 days.

(21) Appl. No.: 13/985,742

(22) PCT Filed: Mar. 29, 2012

(86) PCT No.: PCT/JP2012/058401
§ 371 (c)(1),
(2), (4) Date: Aug. 15, 2013

(87) PCT Pub. No.: WO2012/133666
PCT Pub. Date: Oct. 4, 2012

(65) Prior Publication Data
US 2013/0324364 A1 Dec. 5, 2013

(30) Foreign Application Priority Data
Mar. 31, 2011 (JP) .................................. 2011-079745

(51) Int. Cl.
*B60W 10/11* (2012.01)
*B60W 10/04* (2006.01)
(Continued)

(52) U.S. Cl.
CPC .............. *B60W 10/11* (2013.01); *B60W 10/04* (2013.01); *F16H 61/20* (2013.01); *F16H 61/686* (2013.01); *F16H 2061/207* (2013.01); *Y10T 477/688* (2015.01)

(58) Field of Classification Search
USPC .......................................... 477/112, 113, 115
See application file for complete search history.

(56) References Cited

U.S. PATENT DOCUMENTS

| 4,829,853 | A | 5/1989 | Sakaguchi |
| 5,772,553 | A | 6/1998 | Tsukamoto et al. |
| 8,620,544 | B2 * | 12/2013 | Lochocki et al. ............... 701/58 |

(Continued)

FOREIGN PATENT DOCUMENTS

| DE | 102006014946 A1 | 3/2007 |
| JP | B2-61-57214 | 12/1986 |

(Continued)

OTHER PUBLICATIONS

Mar. 19, 2013 International Search Report issued in PCT/JP2013/053329 (with translation).

(Continued)

*Primary Examiner* — Derek D Knight
*Assistant Examiner* — Timothy M Hannon
(74) *Attorney, Agent, or Firm* — Oliff PLC

(57) ABSTRACT

A control apparatus for a transmission that form a plurality of shift speeds by engaging those of a plurality of engagement elements which need be engaged for each shift speed. The control apparatus having a target shift speed changing unit that changes a target shift speed based on a vehicle speed and a neutral control unit that, when predetermined conditions that are predetermined to bring the transmission into a neutral state are satisfied during traveling, engages at least one of the engagement elements that need be engaged to attain the target shift speed, and disengages the remainder of the engagement elements, thereby bringing the transmission into the neutral state.

10 Claims, 7 Drawing Sheets

(51) Int. Cl.
*F16H 61/20* (2006.01)
*F16H 61/686* (2006.01)

(56) References Cited

U.S. PATENT DOCUMENTS

| | | |
|---|---|---|
| 2002/0038580 A1 | 4/2002 | Horiguchi |
| 2004/0138027 A1 | 7/2004 | Rustige et al. |
| 2004/0242359 A1 | 12/2004 | Sugawara et al. |
| 2010/0250075 A1 | 9/2010 | Suzuki et al. |
| 2011/0238248 A1 | 9/2011 | Suzuki et al. |

FOREIGN PATENT DOCUMENTS

| | | |
|---|---|---|
| JP | A-07-069103 | 3/1995 |
| JP | B2-2885053 | 4/1995 |
| JP | B2-7-94865 | 10/1995 |
| JP | A-9-72415 | 3/1997 |
| JP | B2-3855966 | 12/2006 |
| JP | A-2008-275001 | 11/2008 |
| JP | A-2010-223399 | 10/2010 |
| JP | A-2011-202737 | 10/2011 |
| JP | A-2011-214673 | 10/2011 |
| WO | WO 2008/132591 A2 | 11/2008 |
| WO | WO 2011/122115 A1 | 10/2011 |

OTHER PUBLICATIONS

U.S. Appl. No. 13/777,690, filed Feb. 26, 2013 in the name of Ichikawa et al.
Feb. 27, 2014 Office Action issued in U.S. Appl. No. 13/777,690.
Jul. 3, 2012 International Search Report issued in International Application No. PCT/JP2012/058401 (with translation).
Jun. 1, 2015 Search Report issued in European Application No. 12764367.4.

\* cited by examiner

|  | | C-1 | C-2 | C-3 | B-1 | B-2 | F-1 |
|---|---|---|---|---|---|---|---|
| P | | | | | | | |
| REV | | | | ○ | | ○ | |
| N | | | | | | | |
| D | 1st | ○ | | | | ● | ○ |
| | 2nd | ○ | | | ○ | | |
| | 3rd | ○ | | ○ | | | |
| | 4th | ○ | ○ | | | | |
| | 5th | | ○ | ○ | | | |
| | 6th | | ○ | | ○ | | |

○: ENGAGE, ●: ENGAGE WHEN ENGINE BRAKE IS IN OPERATION

| | | C-1 | C-2 | C-3 | C-4 | C-5 | C-6 | B-1 | B-2 | F-1 |
|---|---|---|---|---|---|---|---|---|---|---|
| D | 1st | O | | | | O | | | ● | O |
| | 2nd | O | | | | O | | O | | |
| | 3rd | O | | | | | O | O | | |
| | 4th | O | | | O | | O | | | |
| | 5th | O | | | O | | O | | | |
| | 6th | O | O | | | | O | | | |
| | 7th | | O | O | | | O | | | |
| | OD1 | | O | O | | | O | | | |
| | OD2 | | O | O | | O | | | | |
| | OD3 | | O | | | (O) | | O | | |
| R | Rev1 | | | O | | O | | | O | |
| | Rev2 | | | O | | | O | | O | |
| | Rev3 | | | | O | O | | | O | |
| | Rev4 | | | | O | | O | | O | |

O: ENGAGE, ●: ENGAGE WHEN ENGINE BRAKE IS IN OPERATION

CONTROL APPARATUS FOR TRANSMISSION, AND CONTROL METHOD FOR TRANSMISSION

INCORPORATION BY REFERENCE

The disclosure of Japanese Patent Application No. 2011-079745 filed on Mar. 31, 2011 including the specification, drawings and abstract is incorporated herein by reference in its entirety.

BACKGROUND OF THE INVENTION

The present invention relates to control apparatuses for transmissions and control methods for the transmissions.

Description of the Related Art

Conventionally, as this type of control apparatuses for transmissions, automatic transmission apparatuses have been proposed in which, when the vehicle speed is zero, an accelerator pedal is released, and a brake pedal is stepped on with a forward drive range (D range) selected, a clutch to be engaged upon starting is disengaged, but is brought into a slip state to bring a transmission to a neutral state (see, e.g., Japanese Patent Application Publication No. H09-072415 (JP 09-072415 A)). In this apparatus, the clutch to be engaged upon starting is disengaged to reduce the load that is applied to the engine side, thereby improving fuel economy, and to prevent generation of vibrations in the vehicle. Moreover, since the clutch to be engaged upon starting is brought into the slip state, this clutch can be quickly engaged upon starting.

SUMMARY OF THE INVENTION

In automobiles having a commonly used automatic transmission apparatus mounted thereon, if an accelerator pedal is released during traveling in a forward drive range (D range), a transmission is controlled to a shift speed according to the vehicle speed, and the engine brake operates in the vehicle according to the shift speed. In order to further improve the fuel economy, if the accelerator pedal is released, the transmission can be brought into the neutral state even during traveling in the D range, and the vehicle can be caused to travel through inertia so that the engine brake does not operate. Thereafter, a shift speed according to the vehicle speed can be formed when the accelerator pedal is stepped on. In this case, in order to enhance reacceleration response, preparations for clutch engagement such as adjusting the oil pressure for the clutch forming the shift speed can be made so that the shift speed according to the vehicle speed can be immediately formed. However, if the vehicle speed changes during traveling in the neutral state and the shift speed upon reacceleration changes, the clutch forming the shift speed is changed. Accordingly, reacceleration cannot be ensured by merely preparing for engagement of a specific clutch.

It is a primary object of a control apparatus for a transmission and a control method for the transmission according to the present invention to more properly prepare for reacceleration when the transmission is brought into a neutral state during traveling.

The control apparatus for the transmission and the control method for the transmission according to the present invention employ the following means in order to attain the above primary object.

A control apparatus for a transmission according to a first aspect of the present invention is a control apparatus for a transmission that form a plurality of shift speeds by engaging those of a plurality of engagement elements which need be engaged for each shift speed. The control apparatus includes: a target shift speed changing unit that changes a target shift speed based on a vehicle speed; and a neutral control unit that, when predetermined conditions that are predetermined to bring the transmission into a neutral state are satisfied during traveling, engages at least one of the engagement elements that need be engaged to attain the target shift speed, and disengages the remainder of the engagement elements, thereby bringing the transmission into the neutral state.

In the control apparatus for the transmission according to the first aspect, when the predetermined conditions that are predetermined to bring the transmission into the neutral state are satisfied during traveling, at least one of the engagement elements that need be engaged to attain the target shift speed that is changed according to the vehicle speed is engaged, and the remainder of the engagement elements is disengaged to bring the transmission into the neutral state. Thus, upon reacceleration, the target shift speed of the transmission can be attained by merely engaging the remainder of the engagement elements, whereby the reacceleration can be quickly carried out. As used herein, the expression "during traveling" means that the vehicle speed is not equal to the value 0, and the vehicle is traveling forward or backward, and does not include the state where the engine is operated but the vehicle speed is equal to the value 0. The expression "neutral state" means the state where no power transmission is performed between an input shaft and an output shaft of the transmission. That is, the "neutral state" means that due to idling of the transmission, the power (including braking force) that is input to the input shaft of the transmission is not transmitted to the output shaft of the transmission (the wheel side), and the power (including braking force) that is input to the output shaft of the transmission is not transmitted to the input shaft of the transmission. The expression "at least one of the engagement elements" means any number of engagement elements equal to or smaller than (n−1) if "n" is the number of "engagement elements that need be engaged to attain the target shift speed." For example, there is a case where the engagement element is a friction engagement element and the friction engagement element is engaged by an oil pressure from a hydraulic circuit. In this case, the "disengaged state" includes the state where the engagement element is subjected to a certain level of oil pressure, because the engagement element need only be released from the engaged state.

In the control apparatus for the transmission according to the first aspect, the at least one of the engagement elements may be determined for each shift speed, and the neutral control unit may be a unit that, if the transmission is in the neutral state and the target shift speed is changed by the target shift speed changing unit to the target shift speed for which the at least one of the engagement elements is changed, changes an engagement state from a state where the at least one of the engagement elements corresponding to the target shift speed before the change is engaged to a state where the at least one of the engagement elements corresponding to the target shift speed after the change is engaged. Thus, even if the target shift speed is changed to the target shift speed for which the at least one of the engagement elements is changed, the at least one of the engagement elements to be engaged is changed according to the change of the target shift speed. Accordingly, the transmission can be made to attain the target shift speed after the change by merely engaging the remainder of the engagement elements corresponding to the target shift speed after the change. As a result, reacceleration can be quickly carried out even if the target shift speed is changed to the target shift speed for which the at least one of the engagement elements is changed.

In the control apparatus for the transmission according to the first aspect, the neutral control unit may be a unit that includes, of the engagement elements that need be engaged to attain the target shift speed, the common engagement element that need be engaged to attain one of a shift speed that is one shift speed lower than the target shift speed and a shift speed that is one shift speed higher than the target shift speed as one of the at least one of the engagement elements to bring the transmission into the neutral state. This can reduce the need to change the engagement element that is to be engaged to bring the transmission into the neutral state when the target shift speed is changed in response to a change in vehicle speed. The expression "shift speed that is one shift speed lower than the target shift speed" refers to a shift speed closest to the target shift speed out of the shift speeds that are used on the lower vehicle speed side with respect to the target shift speed, and for example, corresponds to the second speed in the case where the transmission is a six-speed transmission and the target shift speed is the third speed. The expression "shift speed that is one shift speed higher than the target shift speed" refers to a shift speed closest to the target shift speed out of the shift speeds that are used on the higher vehicle speed side with respect to the target shift speed, and for example, corresponds to the fourth speed in the case where the transmission is a six-speed transmission and the target shift speed is the third speed.

In control apparatus for the transmission according to the first aspect in which the common engagement element is engaged, the transmission may be a transmission in which a first engagement element of the plurality of engagement elements need be engaged at any of the lowest shift speed to a predetermined shift speed, and a second engagement element different from the first engagement element of the plurality of engagement elements need be engaged at any of the predetermined shift speed to the highest shift speed, and the neutral control unit may be a unit that includes the first engagement element as one of the at least one of the engagement elements to bring the transmission into the neutral state if the target shift speed is any of the lowest shift speed to the shift speed that is one shift speed lower than the predetermined shift speed, includes either the first engagement element or the second engagement element as one of the at least one of the engagement elements to bring the transmission into the neutral state if the target shift speed is the predetermined shift speed, and includes the second engagement element as one of the at least one of the engagement elements to bring the transmission into the neutral state if the target shift speed is any of the shift speed that is one shift speed higher than the predetermined shift speed to the highest shift speed. As used herein, the expression "lowest shift speed" refers to the shift speed on the lowest vehicle speed side out of the possible shift speeds of the transmission, and for example, corresponds to the first speed in the case of a six-speed transmission. The expression "highest shift speed" refers to the shift speed on the highest vehicle speed side out of the possible shift speeds of the transmission, and for example, corresponds to the sixth speed in the case of a six-speed transmission. The expression "predetermined shift speed" refers to the shift speed on the higher speed side than the lowest shift speed, and the shift speed on the lower speed side than the highest shift speed, and for example, corresponds to any of the second to fifth speeds in the case of a six-speed transmission. Thus, in the above aspect, if the transmission is a six-speed transmission and the predetermined shift speed is the fourth speed, the first engagement element need be engaged in all of the first to fourth speeds, and the second engagement element need be engaged in all of the fourth to sixth speeds. Accordingly, the neutral control unit includes the first engagement element as one of the at least one of the engagement elements to bring the transmission into the neutral state in the case where the target shift speed is any one of the first to third speeds, includes the first engagement element or the second engagement element as one of the at least one of the engagement elements to bring the transmission into the neutral state in the case where the target shift speed is the fourth speed, and includes the second engagement element as one of the at least one of the engagement elements to bring the transmission into the neutral state in the case where the target shift speed is any of the fifth to sixth speeds. This can further reduce the need to change the engagement element to be engaged to bring the transmission to the neutral state, even if the target shift speed is changed according to the change in vehicle speed. In the control apparatus for the transmission according to this aspect of the present invention, the neutral control unit may be a unit that includes the second engagement element as one of the at least one of the engagement elements to bring the transmission into the neutral state if the target shift speed is the predetermined shift speed. That is, the second engagement element common to the shift speeds higher than the predetermined shift speed are engaged. In this case, even if the target shift speed is set to the predetermined shift speed when restoring from the neutral state of the transmission at a relatively high vehicle speed, the engagement element to be engaged is not changed, whereby reacceleration can be quickly carried out.

In the control apparatus for the transmission according to the first aspect, the predetermined conditions may be conditions that a shift position is a forward traveling or reverse traveling position, an accelerator is off, and a brake is off. For example, a condition that a predetermined time, e.g., one or two seconds, has passed since the accelerator is off may be added to the predetermined conditions. In this case, it is determined that the driver intends to neither accelerate nor decelerate, and intends to cause the vehicle to travel through inertia, whereby the neutral state is achieved. Thus, fuel economy can be improved.

A control method for a transmission according to a second aspect of the present invention is a control method for a transmission that form a plurality of shift speeds by engaging those of a plurality of engagement elements which need be engaged for each shift speed, characterized by including. The control method includes, when predetermined conditions that are predetermined to bring the transmission into a neutral state are satisfied during traveling, engaging at least one of the engagement elements that need be engaged to attain a target shift speed that is changed based on a vehicle speed, and disengaging the remainder of the engagement elements, thereby bringing the transmission into the neutral state.

In the control method for the transmission according to the second aspect, when the predetermined conditions that are predetermined to bring the transmission into the neutral state are satisfied during traveling, the at least one of the engagement elements that need be engaged to attain the target shift speed that is changed based on the vehicle speed is engaged, and the remainder of the engagement elements is disengaged, whereby the transmission is brought into the neutral state. Thus, upon reacceleration, the target shift speed of the transmission can be attained by merely engaging the remainder of the engagement elements, whereby the reacceleration can be quickly carried out. As used herein, the expression "during traveling" means that the vehicle speed is not equal to the value 0, and the vehicle is traveling forward or backward, and does not include the state where the engine is operated but the vehicle speed is equal to the value 0. The expression "neutral state" means the state where no power transmission is performed between an input shaft and an output shaft of the transmission. That is, the "neutral state" means that due to idling of the transmission, the power (including braking force) that is input to the input shaft of the transmission is not transmitted to the output shaft of the transmission (the wheel side), and the power (including braking force) that is input to the output shaft of the transmission is not transmitted to the input shaft of the transmission. The expression "at least one of the engagement elements" means any number of engagement elements equal to or smaller than (n−1) if "n" is the number of "engagement elements that need be engaged to attain the target shift speed." For example, there is a case where the engagement element is a friction engagement element and the friction engagement element is engaged by an oil pressure from a hydraulic circuit. In this case, the "disengaged state" includes the state where the engagement element is subjected to a certain level of oil pressure, because the engagement element need only be released from the engaged state.

DETAILED DESCRIPTION OF THE EMBODIMENTS

Figure 1:
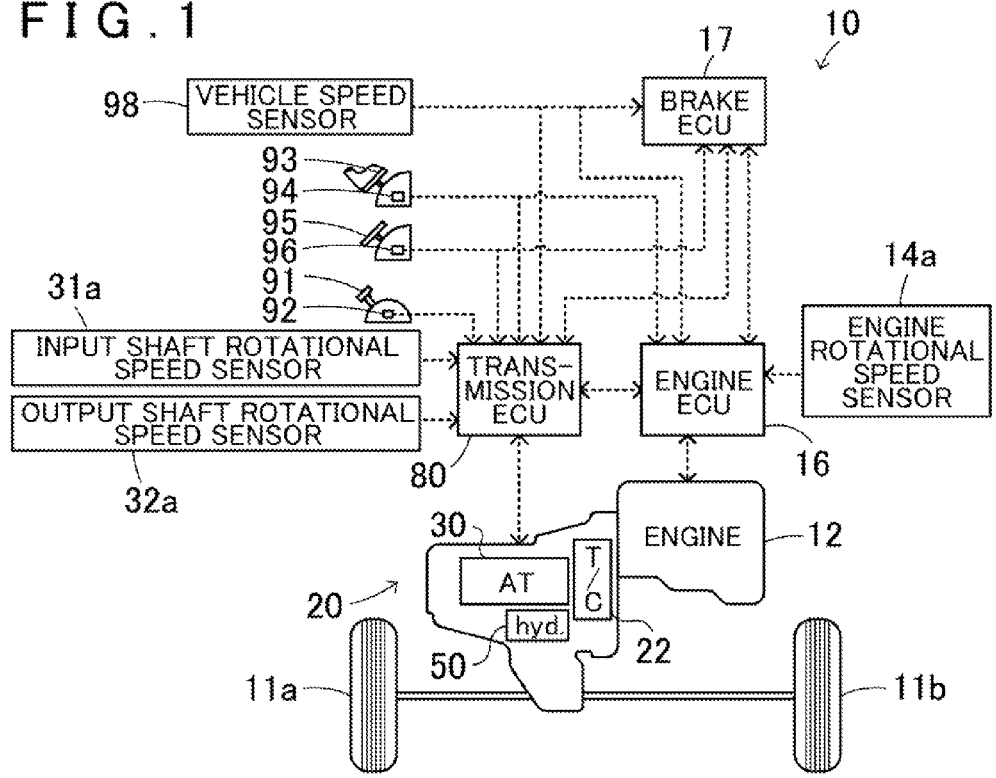
FIG. 1 is a configuration diagram schematically showing the configuration of an automobile 10 on which an automatic transmission apparatus 20 containing a control apparatus for a transmission as an embodiment of the present invention is mounted.
Figure 2:
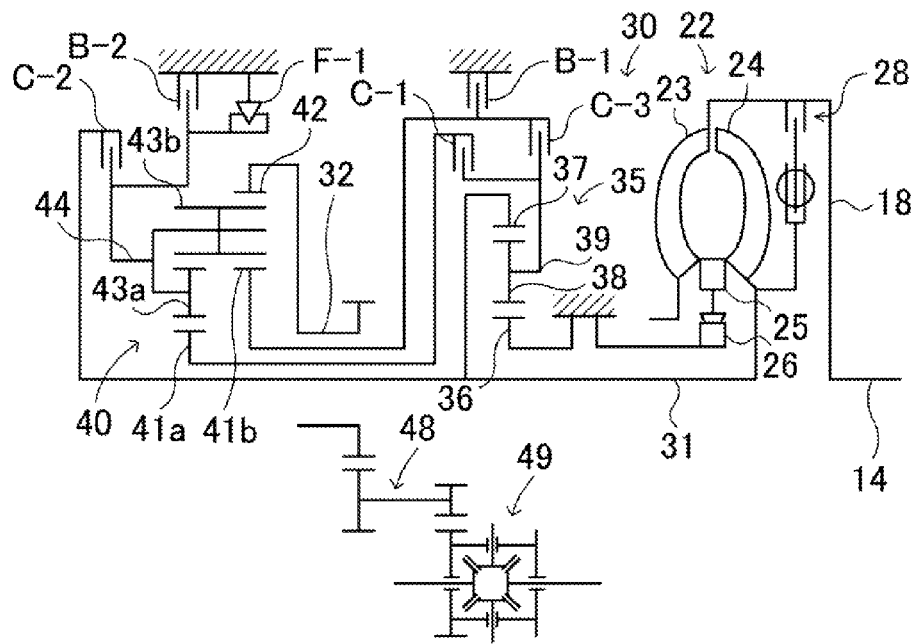
FIG. 2 is a configuration diagram schematically showing the mechanical configuration of the automatic transmission apparatus 20.

A mode for carrying out the present invention will be described by using an embodiment. FIG. 1 is a configuration diagram schematically showing the configuration of an automobile 10 on which an automatic transmission apparatus 20 containing a control apparatus for a transmission as an embodiment of the present invention is mounted. FIG. 2 is a configuration diagram schematically showing the mechanical configuration of the automatic transmission apparatus 20. As shown in FIGS. 1 and 2, the automobile 10 of the embodiment includes: an engine 12 as an internal combustion engine that outputs power by explosive combustion of hydrocarbon fuel such as gasoline or light oil; an engine electronic control unit (hereinafter referred to as the "engine ECU") 16 that performs operation control of the engine 12; a fluid transmission apparatus 22 attached to a crankshaft 14 of the engine 12; a stepped automatic transmission 30 that has an input shaft 31 connected to the output side of the fluid transmission apparatus 22 and an output shaft 32 connected to drive wheels 11a, 11b via a gear mechanism 48 and a differential gear 49, and that shifts power input to the input shaft 31 to transmit the shifted power to the output shaft 32; a hydraulic circuit 50 that supplies hydraulic oil to the fluid transmission apparatus 22 and the automatic transmission 30; a transmission electronic control unit (hereinafter referred to as the "transmission ECU") 80 that controls the hydraulic circuit 50 to control the fluid transmission apparatus 22 and the automatic transmission 30; and a brake electronic control unit (hereinafter referred to as the "brake ECU") 17 that controls an electronically controlled hydraulic brake unit, not shown. The automatic transmission 30, the hydraulic circuit 50, and the transmission ECU 80 primarily corresponds to the automatic transmission apparatus 20 of the embodiment. The transmission ECU 80 corresponds to the control apparatus for the transmission.

The engine ECU 16 is configured as a microprocessor having a CPU as a core component, and includes, in addition to the CPU, a ROM that stores a processing program, a RAM that temporarily stores data, input and output ports, and a communication port. Signals from various sensors that detect the operating state of the engine 12 such as an engine rotational speed Ne from a rotational speed sensor 14a attached to the crankshaft 14, and signals such as an accelerator operation amount Acc from an accelerator pedal position sensor 94 that detects the accelerator operation amount Acc as the stepping amount of an accelerator pedal 93, and a vehicle speed V from a vehicle speed sensor 98 are input to the engine ECU 16 via the input port. A drive signal to a throttle motor that drives a throttle valve, a control signal to a fuel injection valve, an ignition signal to an ignition plug, etc. are output from the engine ECU 16 through the output port.

As shown in FIG. 2, the fluid transmission apparatus 22 is configured as a hydraulic torque converter with a lockup clutch, and includes: a pump impeller 23 as an input-side fluid transmission element connected to the crankshaft 14 of the engine 12 via a front cover 18; a turbine runner 24 as an output-side fluid transmission element connected to the input shaft 31 of the automatic transmission 30 via a turbine hub; a stator 25 that is placed inside the pump impeller 23 and the turbine runner 24 to adjust the flow of hydraulic oil from the turbine runner 24 to the pump impeller 23; a one-way clutch 26 that limits the rotation direction of the stator 25 to one direction; and a lockup clutch 28 having a damper mechanism. This fluid transmission apparatus 22 functions as a torque amplifier by the operation of the stator 25 when the difference in rotational speed between the pump impeller 23 and the turbine runner 24 is large, and functions as a fluid coupling when the difference in rotational speed between the pump impeller 23 and the turbine runner 24 is small. The lockup clutch 28 is capable of performing a lockup operation of coupling the pump impeller 23 (front cover 18) to the turbine runner 24 (turbine hub), and is capable of cancelling the lockup. If lockup-ON conditions are satisfied after starting of the automobile 10, the lockup clutch 28 performs the lockup of the pump impeller 23 and the turbine runner 24, so that power from the engine 12 is mechanically and directly transmitted to the input shaft 31. Variations in torque transmitted to the input shaft 31 at this time are absorbed by the damper mechanism.

Figures 3, 4:
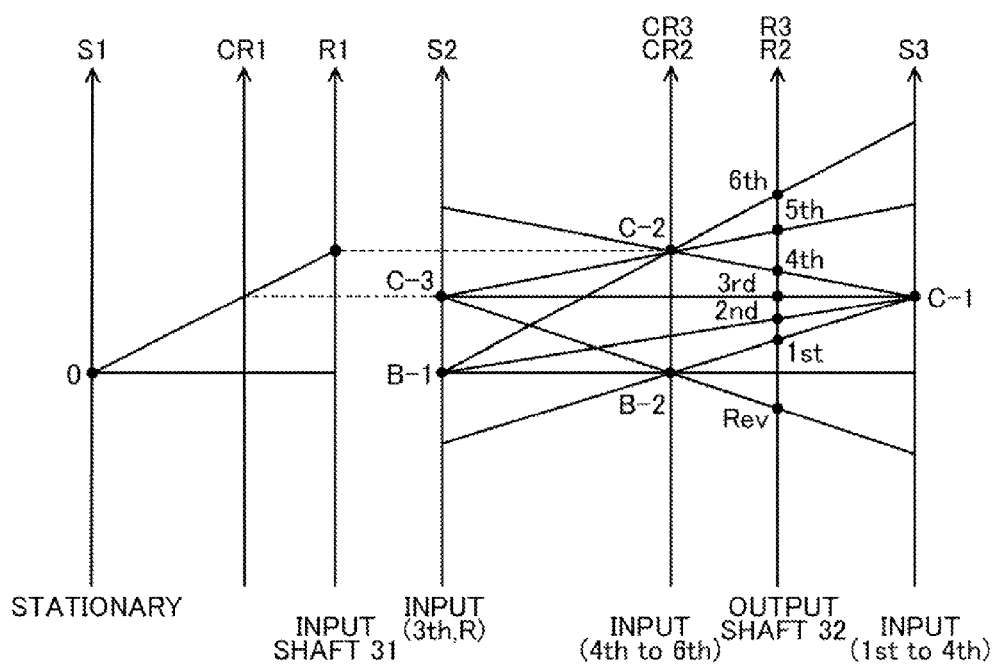
FIG. 3 is an illustration of an operation table showing the relation between each shift speed of an automatic transmission 30 and the operating state of clutches C-1 to C-3 and brakes B-1, B-2.
FIG. 4 is an illustration of a collinear diagram exemplarily showing the relation of the rotational speed among rotating elements forming the automatic transmission 30.

The automatic transmission 30 is configured as a six-speed stepped transmission, and includes a single-pinion type planetary gear mechanism 35, a Ravigneaux type planetary gear mechanism 40, three clutches C-1, C-2, C-3, two brakes B-1, B-2, and a one-way clutch F-1. The single-pinion type planetary gear mechanism 35 includes a sun gear 36 as an external gear, a ring gear 37 as an internal gear placed on a concentric circle with the sun gear 36, a plurality of pinion gears 38 meshing with the sun gear 36 and meshing with the ring gear 37, and a carrier 39 holding the plurality of pinion gears 38 so that the pinion gears 38 can rotate and revolve. The sun gear 36 is fixed to a case, and the ring gear 37 is connected to the input shaft 31. The Ravigneaux type planetary gear mechanism 40 includes two sun gears 41a, 41b as external gears, a ring gear 42 as an internal gear, a plurality of short pinion gears 43a meshing with the sun gear 41a, a plurality of long pinion gears 43b meshing with the sun gear 41b and the plurality of short pinion gears 43a and meshing with the ring gear 42, and a carrier 44 coupling the plurality of short pinion gear 43a and the plurality of long pinion gears 43b and holding the plurality of short pinion gear 43a and the plurality of long pinion gears 43b so that the plurality of short pinion gear 43a and the plurality of long pinion gears 43b can rotate and revolve. The sun gear 41a is connected to the carrier 39 of the single-pinion type planetary gear mechanism 35 via the clutch C-1, the sun gear 41b is connected to the carrier 39 via the clutch C-3 and is connected to the case via the brake B-1, the ring gear 42 is connected to the output shaft 32, and the carrier 44 is connected to the input shaft 31 via the clutch C-2. The carrier 44 is connected to the case via the brake B-2, and is connected to the case via the one-way clutch F-1. FIG. 3 shows an operation table showing the relation between each shift speed of the automatic transmission 30 and the operating state of the clutches C-1 to C-3, the brakes B-1, B-2, and FIG. 4 is a collinear diagram exemplarily showing the relation of the rotational speed among the rotating elements forming the automatic transmission 30. As shown in the operation table of FIG. 3, the automatic transmission 30 can be switched to first to sixth forward speeds, a reverse speed, and a neutral state according to the combination of the ON/OFF states (the ON state corresponds to the engaged state, and the OFF state corresponds to the disengaged state) of the clutches C-1 to C-3 and the ON/OFF states of the brakes B-1, B-2.

The fluid transmission apparatus 22 and the automatic transmission 30 are operated by the hydraulic circuit 50 that is driven and controlled by the transmission ECU 80. The hydraulic circuit 50 includes an oil pump that pumps hydraulic oil by using power from the engine 12, a primary regulator valve that regulates the pressure of the hydraulic oil from the oil pump to generate a line pressure PL, a secondary regulator valve that reduces the line pressure PL from the primary regulator valve to produce a secondary pressure Psec, a modulator valve that regulates the line pressure PL from the primary regulator valve to produce a constant modulator pressure Pmod, a manual valve that switches a supply destination the clutches C-1 to C-3 and the brakes B-1, B-2) of the line pressure PL from the primary regulator valve according to the operation position of a shift lever 91, a plurality of linear solenoid valves that regulates the line pressure PL from the manual valve to produce a solenoid pressure for the corresponding clutches C-1 to C-3 and brakes B-1, B-2, etc, all of which are not shown.

The transmission ECU 80 is configured as a microprocessor having a CPU as a core component, and includes, in addition to the CPU, a ROM that stores a processing program, a RAM that temporarily stores data, input and output ports, and a communication port. An input shaft rotational speed Nin from a rotational speed sensor 31a attached to the input shaft 31, an output shaft rotational speed Nout from a rotational speed sensor 32a attached to the output shaft 32, a shift position SP from a shift position sensor 92 that detects the position of the shift lever 91, an accelerator operation amount Acc from the accelerator pedal position sensor 94, a brake pedal position BP from a brake pedal position sensor 96 that detects the stepping amount of a brake pedal 95, a vehicle speed V from the vehicle speed sensor 98, etc. are input to the transmission ECU 80 via the input port. A control signal to the hydraulic circuit 50 etc. is output from the transmission ECU 80 through the output port.

The engine ECU 16, the brake ECU 17, and the transmission ECU 80 are connected to each other via the communication ports so that they can transmit and receive various control signals and data required for control to and from each other. In the embodiment, a parking position (P position) for use when parking, a reverse position for reverse traveling (R position), a neutral position as a neutral state (N position), a normal drive position for forward traveling (D position), an upshift command position, and a downshift command position are prepared as the shift position SP of the shift lever 91.

Figure 5:
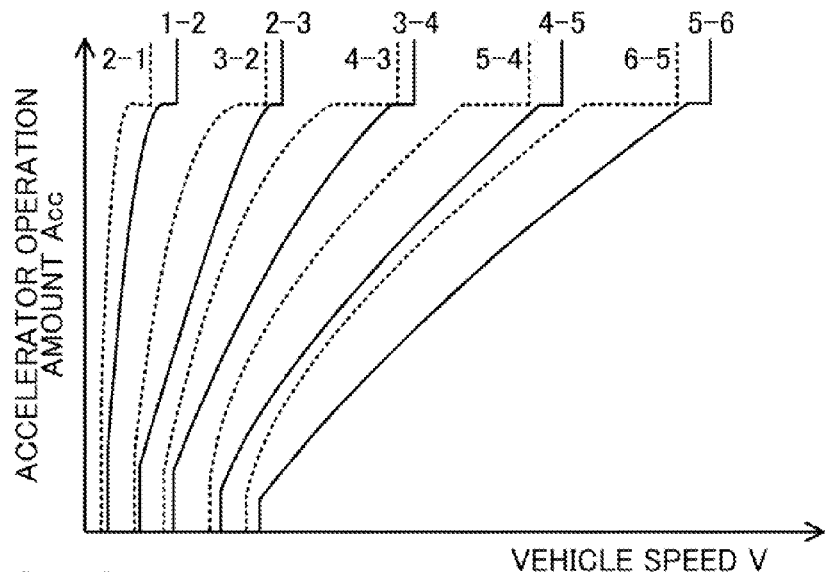
FIG. 5 is an illustration showing an example of a shift map.

As shown in the shift map of FIG. 5, when the shift position SP of the shift lever 91 is the drive position (D position), and the operation point formed by the accelerator operation amount Acc and the vehicle speed V crosses a 1-2 upshift line, a 2-3 upshift line, a 3-4 upshift line, a 4-5 upshift line, or a 5-6 upshift line shown by solid line in FIG. 5 from left to right at a shift speed equal to or lower than the shift speed shown by the numeral on the left side (e.g., in the case of the 2-3 upshift line, any of the first to second speeds), the automatic transmission apparatus 20 of the embodiment thus configured switches on/off the clutches C-1 to C-3 and the brakes B-1, B-2 so as to upshift from the shift speed at that time to the shift speed shown by the numeral on the right side (e.g., in the case of the 2-3 upshift line, the third speed). When the shift position SP of the shift lever 91 is the drive position (D position), and the operation point formed by the accelerator operation amount Acc and the vehicle speed V crosses a 6-5 downshift line, a 5-4 downshift line, a 4-3 downshift line, a 3-2 downshift line, or a 2-1 downshift line shown by broken line in FIG. 5 from right to left at a shift speed equal to or higher than the shift speed shown by the numeral on the left side (e.g., in the case of the 4-3 downshift line, any of the fourth to sixth speeds), the automatic transmission apparatus 20 switches on/off the clutches C-1 to C-3 and the brakes B-1, B-2 so as to downshift from the shift speed at that time to the shift speed shown by the numeral on the right side (e.g., in the case of the 4-3 downshift line, the third speed).

Figure 6:
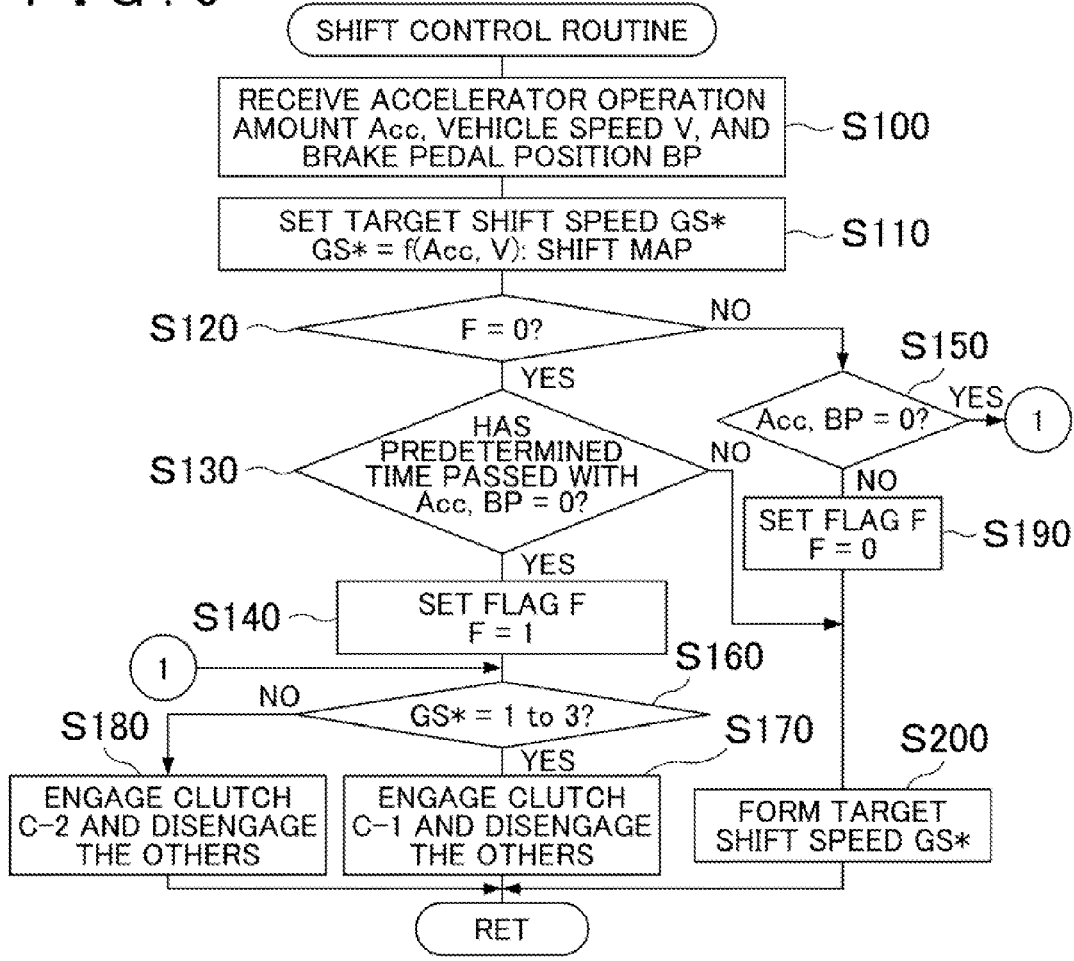
FIG. 6 is a flowchart showing an example of a shift control routine that is performed by a transmission ECU 80 when a shift position SP is a drive position (D position)

Operation of the automatic transmission apparatus 20 of the embodiment, especially operation in the case where the shift position SP of the shift lever 91 is the drive position (D position), will be described below. FIG. 6 is a flowchart showing an example of a shift control routine that is performed by the transmission ECU 80 when the shift position SP is the drive position (D position). This routine is repeatedly performed every predetermined time (e.g., every several milliseconds or every several tens of milliseconds).

When the shift control routine is performed, the transmission ECU 80 first receives data required for control, such as the accelerator operation amount Acc from the accelerator pedal position sensor 94, the brake pedal position BP from the brake pedal position sensor 96, the vehicle speed V from the vehicle speed sensor 98, etc. (step S100), and sets a target shift speed GS* based on the received accelerator operation amount Acc and vehicle speed V and the shift map exemplarily shown in FIG. 5 (step S110). Next, the transmission ECU 80 checks the value of an idle coast execution flag F that shows whether the state where the vehicle is traveling by inertia with the automatic transmission 30 in the neutral state (hereinafter this state is referred to as the "idle coast") is being executed or not (step S120). If the idle coast execution flag F is the value 0, the transmission ECU 80 determines that the idle coast is not being executed and checks if a predetermined time has not passed with both the accelerator operation amount Acc and the brake pedal position BP being kept at the value 0 (step S130), and switches on/off the clutches C-1 to C-3, the brakes B-1, B-2 so that the target shift speed GS* set to the automatic transmission 30 is formed (step S200), whereby the routine is terminated. The idle coast execution flag F is set by this routine. The value 1 is set when the idle coast is being executed, and the value 0 is set when the idle coast is not being executed. The conditions that the predetermined time has passed with both the accelerator operation amount Acc and the brake pedal position BP being kept at the value 0 are the conditions that the idle coast is to be executed. The idle coast is the state where the vehicle travels through inertia by using kinetic energy of the vehicle at that time. Thus, in order to confirm the driver's intention, it is necessary that both the accelerator operation amount Acc and the brake pedal position BP be equal to the value 0 and that this state be continuing. Accordingly, the predetermined time can be set to the time enough to confirm the driver's intention, such as, e.g., one or two seconds.

If it is determined in step S120 that the idle coast execution flag F is equal to the value 0, and it is determined in step S130 that the predetermined time has passed with both the accelerator operation amount Acc and the brake pedal position BP being kept at the value 0, the transmission ECU 80 determines that the idle coast should be executed, and sets the value 1 to the idle coast execution flag F (step S140), and checks the target shift speed GS* (step S160). If the target shift speed GS* is any of the first to third speeds, the clutch C-1 is switched on, and the other clutches C-2, C-3 and the brakes B-1, B-2 are switched off (step S170), whereby the routine is terminated. In order to form one of the first to third speeds as the shift speed of the automatic transmission 30, it is necessary to switch on the clutch C-1 and to switch on one of the brake B-2, the brake B-1, and the clutch C-3. However, since the clutch C-1 is switched on, but all of the brakes B-2, B-1 and the clutch C-3 are switched off, none of the first to third speeds is formed, whereby the automatic transmission 30 is brought into the neutral state. Accordingly, the vehicle travels through inertia, namely travels through the idle coast thereafter. Since the accelerator operation amount Acc is equal to the value 0 and the automatic transmission 30 is in the neutral state, the engine 12 is idled by idling control. Unlike the case where the shift position SP of the shift lever 91 is switched to the neutral position (N position), in the neutral state of the embodiment obtained by switching on the clutch C-1, any of the first to third speeds can be immediately formed by switching one of the brake B-2, the brake B-1, and the clutch C-3, because the clutch C-1 is on. That is, the automatic transmission 30 is in such a neutral state that the automatic transmission 30 is ready to form any of the first to third speeds as the target shift speed GS* (the clutch C-1 is on).

On the other hand, if it is determined in step S160 that the target shift speed GS* is any of the fourth to sixth speeds, the clutch C-2 is switched on, and the other clutches C-1, C-3 and the brakes B-1, B-2 are switched off (step S180), whereby the routine is terminated. In the operation table of FIG. 3, in order to form one of the fourth to sixth speeds as the shift speed of the automatic transmission 30, it is necessary to switch on the clutch C-2, and to switch on one of the clutch C-1, the clutch C-3, and the brake B-1. However, since the clutch C-2 is switched on, but all of the other clutches C-1, C-3 and the brake B-1 are switched off, none of the fourth to sixth speeds is formed, whereby the automatic transmission 30 is brought into the neutral state. Accordingly, the vehicle travels through the idle coast thereafter. In this case as well, since the accelerator operation amount Acc is equal to the value 0 and the automatic transmission 30 is in the neutral state, the engine 12 is idled by idling control. Unlike the case where the shift position SP of the shift lever 91 is switched to the neutral position (N position), in the neutral state obtained by switching on the clutch C-2, any of the fourth to sixth speeds can be immediately formed by switching one of the clutch C-1, the clutch C-3, and the brake B-1, because the clutch C-2 is on, as in the case of the above neutral state obtained by switching on the clutch C-1. That is, the automatic transmission 30 is in such a neutral state that the automatic transmission 30 is ready to form any of the fourth to sixth speeds as the target shift speed GS* (the clutch C-2 is on).

When traveling through the idle coast is thus started, it is determined in step S120 that the idle coast execution flag F is the value 1, and it is determined if both the accelerator operation amount Acc and the brake pedal position BP have been kept at the value 0 (step S150), If it is determined that both the accelerator operation amount Acc and the brake pedal position BP have been kept at the value 0, the idle coast is continued as either the neutral state that is obtained by switching on the clutch C-1 or the neutral state that is obtained by switching on the clutch C-2, according to the target shift speed GS* in steps S160 to S180. If the target shift speed GS* is changed from the fourth speed to the third speed, the operation state is switched from the neutral state that is obtained by switching on the clutch C-2 to the neutral state that is obtained by switching on the clutch C-1. On the contrary, if the target shift speed GS* is changed from the third speed to the fourth speed, the operation state is switched from the neutral state that is obtained by switching on the clutch C-1 to the neutral state obtained by switching on the clutch C-2.

If the driver steps on the accelerator pedal 93 during traveling through the idle coast and the acceleration operation amount Acc is no longer equal to the value 0, or if the driver steps on the brake pedal 95 during traveling through the idle coast and the brake pedal position BP is no longer equal to the value 0, it is determined in step S150 that not both the accelerator operation amount Acc and the brake pedal position BP are kept at the value 0, and the value 0 is set to the idle coast execution flag F (step S190), and the clutches C-1 to C-3 and the brakes B-1, B-2 are switched on/off so as to form the target shift speed GS* set at that time (step S200), whereby the routine is terminated. It is now assumed that the accelerator pedal 93 is stepped on while the vehicle is traveling through the idle coast in the neutral state obtained by switching on the clutch C-1. In this case, the target shift speed GS* is any of the first to third speeds, although it depends on the stepping amount of the accelerator pedal 93. Accordingly, the target shift speed GS* can be formed by merely switching on one of the brake B-2, the brake B-1, and the clutch C-3. It is now assumed that the accelerator pedal 93 is stepped on while the vehicle is traveling through the idle coast in the neutral state obtained by switching on the clutch C-2. In this case, since the vehicle speed V is relatively high, the target shift speed GS* is any of the forth to sixth speeds in many cases, although it depends on the stepping amount of the accelerator pedal 93. Accordingly, the target shift speed GS* can be formed by merely switching on one of the clutch C-1, the clutch C-3, and the brake B-1. If the driver steps on the accelerator pedal 93 to a large extent while the vehicle is traveling through the idle coast in the neutral state obtained by switching on the clutch C-2, the target shift speed GS* may be set to the second or third speed, as can be seen from the shift map in FIG. 5. In this case, it is necessary to switch off the clutch C-2 and switch on the clutch C-1, and to switch on the brake B-1 or the clutch C-3. However, this rarely occurs. Accordingly, as compared to the case where both the clutch C-1 and the clutch C-2 are switched off so that the vehicle travels with the automatic transmission 30 being in a state similar to the state where the shift position SP is the neutral position, restoration from traveling through the idle coast (formation of the shift speed) can be quickly carried out, whereby reacceleration can be quickly performed. When the target shift speed GS* is the fourth speed, the clutch C-2 common to the higher shift speeds (fifth and sixth speeds) is engaged rather than engaging the clutch C-1 common to the lower shift speeds (first to third speeds), because traveling through the idle coast is often carried out when the vehicle is traveling at a relatively high vehicle speed.

Figure 7:
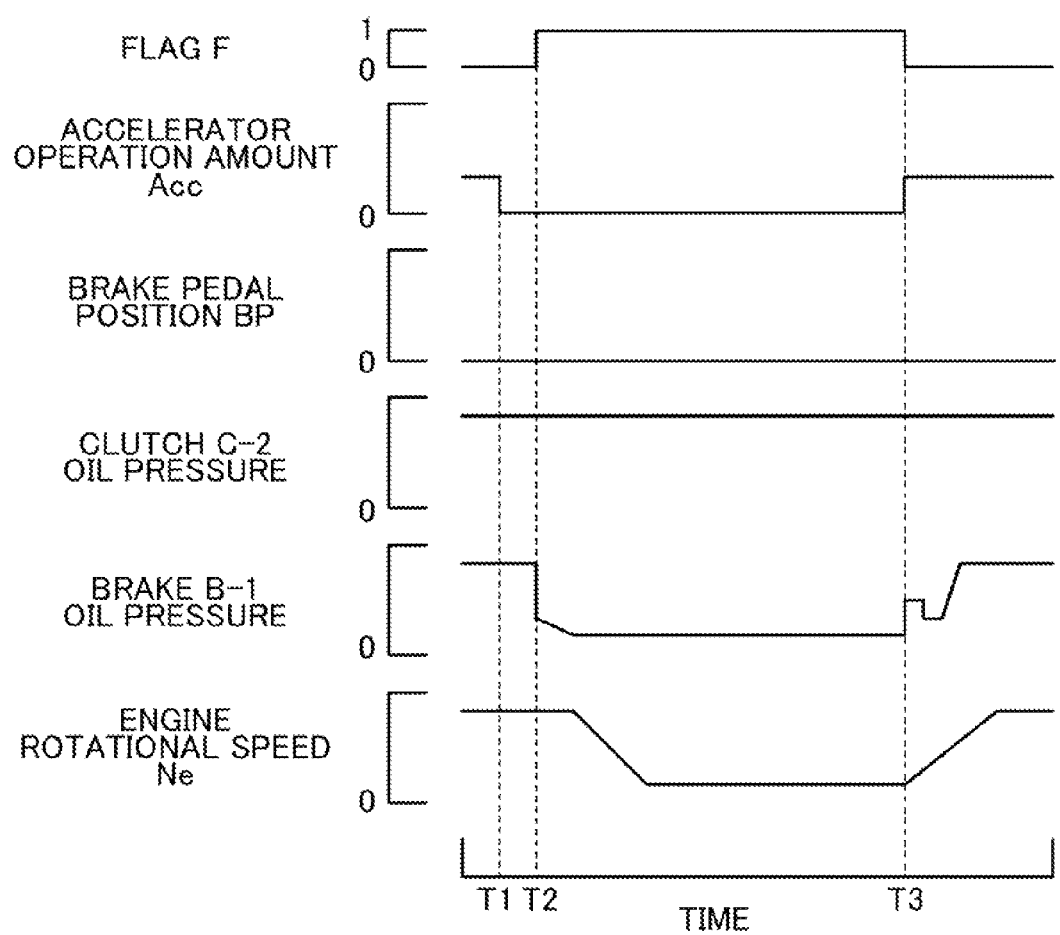
FIG. 7 is an illustration showing an example of change with time in accelerator operation amount Acc, clutches, brakes, etc. when the traveling state of a vehicle is switched from traveling at the sixth speed to traveling by idle coast and is restored from the idle coast at the sixth speed.
Figure 8:
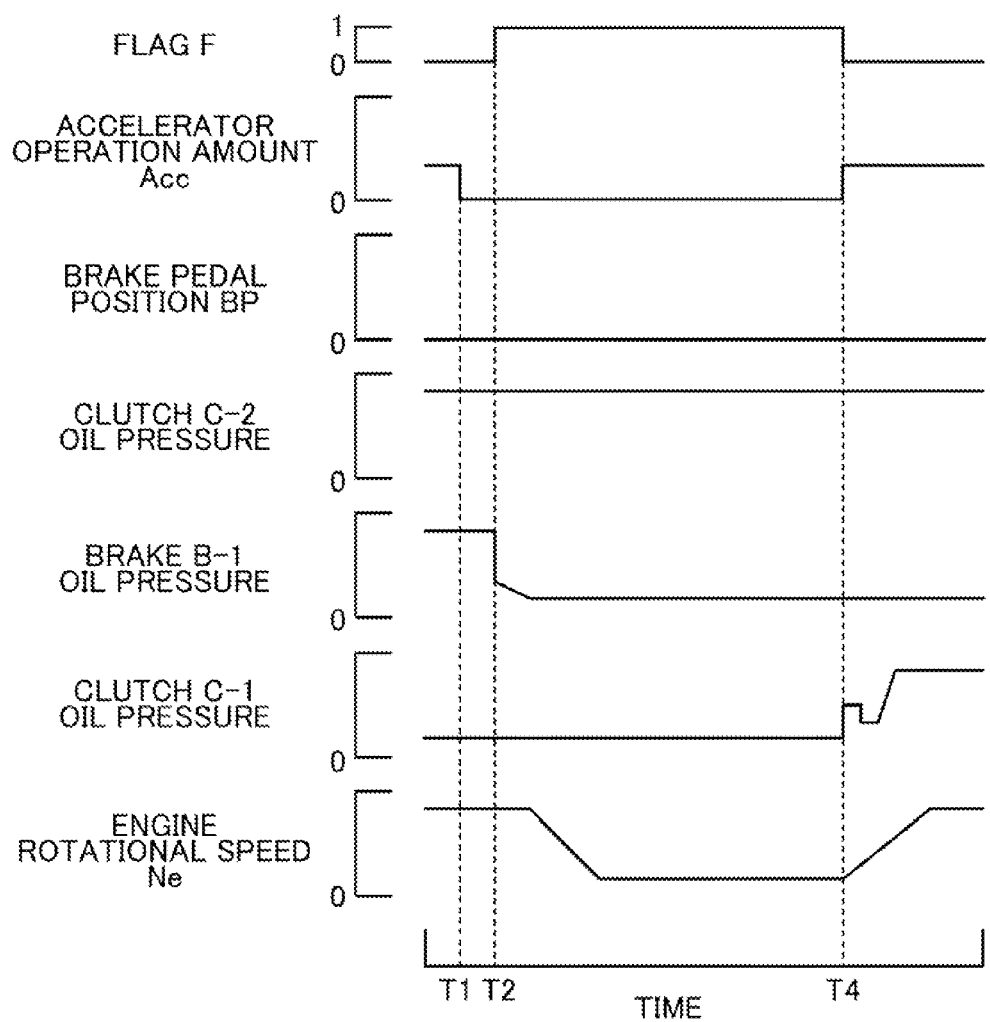
FIG. 8 is an illustration showing an example of change with time in accelerator operation amount Acc, clutches, brakes, etc. when the traveling state of the vehicle is switched from traveling at the sixth speed to traveling through the idle coast and is restored from the idle coast at the fourth speed.
Figure 9:
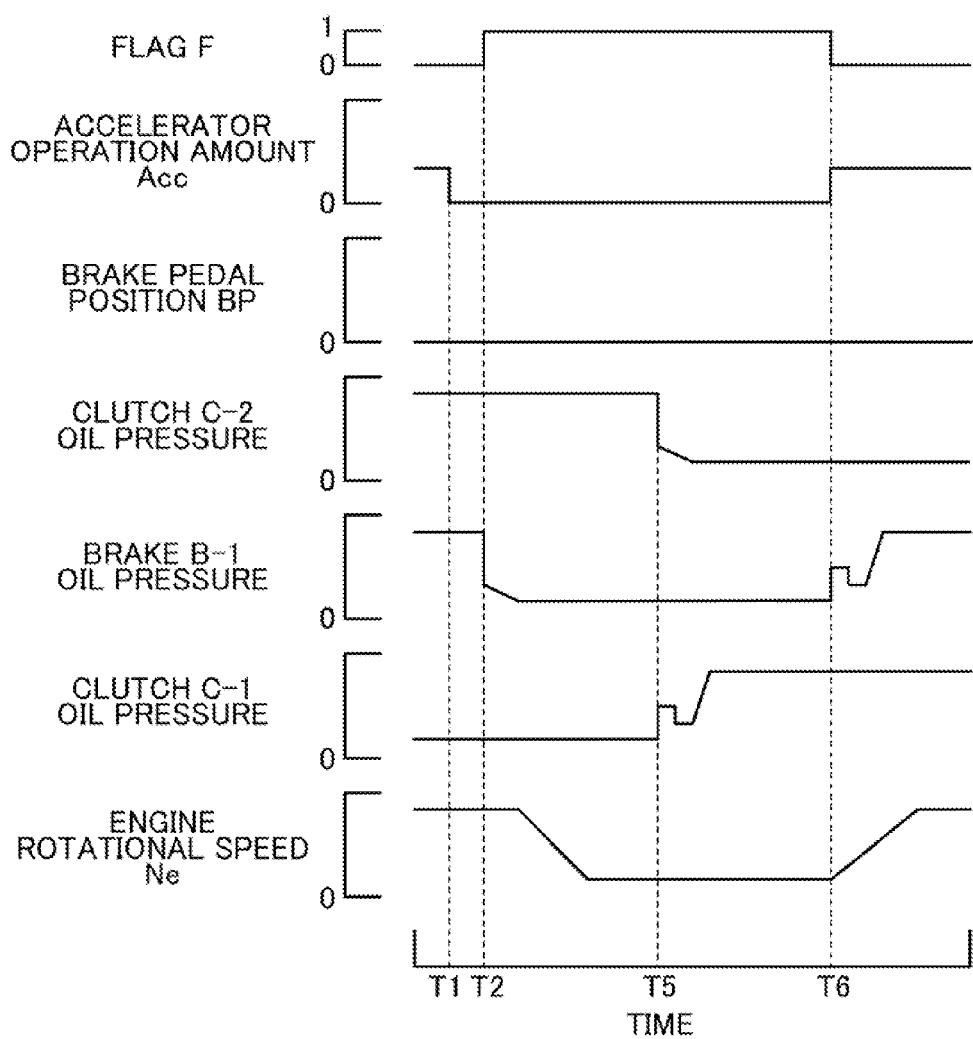
FIG. 9 is an illustration showing an example of change with time in accelerator operation amount Acc, clutches, brakes, etc. when the traveling state of the vehicle is switched from traveling at the sixth speed to traveling through the idle coast, the target shift speed GS* is changed to the third speed during the traveling through the idle coast, and the traveling state of the vehicle is restored from the idle coast at the second speed.

FIG. 7 shows an example of change with time in the idle coast execution flag F, the accelerator operation amount Acc, the brake pedal position BP, the clutch C-2, the clutch C-1, the brake B-1, the engine rotational speed Ne, etc. when the traveling state of the vehicle is switched from traveling at the sixth speed to traveling through the idle coast and is restored from the idle coast at the sixth speed. FIG. 8 shows an example of change with time in these values when the traveling state of the vehicle is switched from traveling at the sixth speed to traveling through the idle coast and is restored from the idle coast at the fourth speed. FIG. 9 shows an example of change with time in these values when the traveling state of the vehicle is switched from traveling at the sixth speed to traveling through the idle coast, the target shift speed GS* is changed to the third speed during the traveling through the idle coast, and the traveling state of the vehicle is restored from the idle coast at the second speed. As shown in FIGS. 7 to 9, the traveling state of the vehicle is shifted from traveling at the sixth speed to traveling through the idle coast when the value 1 is set to the idle coast execution flag F at time T2, i.e., after the predetermined time from time T1 when both the accelerator operation amount Acc and the brake pedal position BP become equal to the value 0. Specifically, of the clutch C-2 and the brake B-1 forming the sixth speed, the oil pressure for the clutch C-2 is held to maintain the engaged state of the clutch C-2, and the oil pressure for the brake B-1 is controlled to disengage the brake B-1, whereby the traveling state of the vehicle is shifted from traveling at the sixth speed to traveling through the idle coast. As shown in FIG. 7, at time T3 when the accelerator pedal 93 is stepped on and the acceleration operation amount Acc is no longer equal to the value 0, the value 0 is set to the idle coast execution flag F, and the oil pressure for the brake B-1 is controlled to engage the brake B-1, thereby fanning the sixth speed. Restoration from the traveling through the idle coast at the sixth speed is thus carried out. As shown in FIG. 8, at time T4 when the accelerator pedal 93 is stepped on and the acceleration operation amount Acc is no longer equal to the value 0, the value 0 is set to the idle coast execution flag F, and the oil pressure for the clutch C-1 instead of the brake B-1 is controlled to engage the clutch C-1, thereby forming the fourth speed. Restoration from the traveling through the idle coast at the fourth speed is thus carried out. As shown in FIG. 9, if the target shift speed GS* is changed from the fourth speed to the third speed during traveling through the idle coast, the oil pressure for the clutch C-2 is controlled and the oil pressure for the clutch C-1 is controlled to disengage the clutch C-2 and engage the clutch C-1 at time T5 when the target shift speed GS* is changed. At time T6 when the accelerator pedal 93 is stepped on and the acceleration operation amount Acc is no longer equal to the value 0, the value 0 is set to the idle coast execution flag F, and the oil pressure for the brake B-1 is controlled to engage the brake B-1 in order to form the target shift speed GS* that is set by the vehicle speed V and the accelerator operation amount Acc resulting from stepping of the accelerator pedal 93, thereby forming the second speed. Restoration at the second speed by stepping on the accelerator pedal 93 by the driver is carried out in this manner.

According to the automatic transmission apparatus 20 (the control apparatus for the transmission) of the embodiment described above, if the conditions that the idle coast is to be executed are satisfied, namely if the predetermined time has passed with both the accelerator operation amount Acc and the brake pedal position BP being kept at the value 0 during traveling with the shift position SP being the D position, one of two clutch or brake elements, that form the target shift speed GS* obtained by applying the accelerator operation amount Acc and the vehicle speed V to the shift map is engaged and the other clutch or brake element is disengaged to bring the automatic transmission 30 into the neutral state. Thus, upon reacceleration, the target shift speed GS* of the automatic transmission 30 can be formed by merely engaging the other clutch or brake element. Accordingly, reacceleration can be quickly carried out. Moreover, since the engine 12 can be idled during the traveling through the idle coast, fuel economy of the vehicle can be improved. Even if the engine 12 is not idled, load on the engine can be reduced, whereby the fuel economy of the vehicle can be improved.

According to the automatic transmission apparatus 20 (the control apparatus for the transmission) of the embodiment, during traveling through the idle coast and when the target shift speed GS* is any of the first to third speeds, the common clutch C-1 out of the clutch and the brake required to form the first to third speeds is engaged to bring the automatic transmission 30 into the neutral state. During traveling through the idle coast and when the target shift speed GS* is any of the fourth to sixth speeds, the common clutch C-2 out of the clutch and the brake required to form the fourth to sixth speeds is engaged to bring the automatic transmission 30 into the neutral state. This can reduce the need to change the clutch that is to be engaged to bring the automatic transmission 30 into the neutral state when the target shift speed GS* is changed in response to a change in vehicle speed due to a change in road condition.

In the automatic transmission apparatus 20 (the control apparatus for the transmission) of the embodiment, during traveling through the idle coast, one of two clutch or brake elements forming the target shift speed GS* is engaged and the other clutch or brake element is disengaged to bring the automatic transmission 30 into the neutral state. However, since the disengaged other clutch or brake element need only be released from the engaged state, the oil pressure for this clutch or brake element may be fully reduced, or the clutch or brake element may stand by in the state where fast-fill is completed. For example, a hydraulic oil chamber of a hydraulic servo may be filled with the oil in the state where the piston of the clutch etc. is located at the attached position (the state where the piston is in contact with a drum or a hub forming the hydraulic oil chamber by the biasing force of the return spring).

In the automatic transmission apparatus 20 (the control apparatus for the transmission) of the embodiment, during traveling through the idle coast and when the target shift speed GS* is the fourth speed, the clutch C-2 required to form the fifth or sixth speed out of the clutches C-1, C-2 required to form the fourth speed is engaged, and the clutch C-1 required to form the first to third speeds is disengaged to bring the automatic transmission 30 into the neutral state. However, when the target shift speed GS* is the fourth speed, the clutch C-1 may be engaged and the clutch C-2 may be disengaged.

In the automatic transmission apparatus 20 (the control apparatus for the transmission) of the embodiment, the condition that the shift position SP is the D position, the condition that the accelerator operation amount Acc is equal to the value 0, the condition that the brake pedal position BP is equal to the value 0, and the condition that these conditions have been satisfied for a predetermined time are required as the conditions that the idle coast is to be executed. However, the conditions that the idle coast is to be executed are not limited to these. The conditions that idle coast is to be executed may include the condition that the throttle opening instead of the accelerator operation amount Acc is equal to the value 0 or may not include the condition that the brake pedal position BP is equal to the value 0. That is, any conditions that are suitable for traveling through the idle coast may be used as the conditions that idle coast is to be executed. For example, the conditions that idle coast is to be executed may include the condition that the braking force applied to the vehicle is equal to or less than a predetermined value corresponding to slight deceleration.

Although the six-speed automatic transmission 30 is used in the automatic transmission apparatus 20 of the embodiment, a three, four, or five-speed automatic transmission may be used, or a seven, eight, or more-speed automatic transmission may be used.

In the automatic transmission apparatus 20 of the embodiment, each of the clutches C-1 to C-3 and the brakes B-1, B-2 is a friction engagement element having a hydraulic servo. However, at least one of these clutches and brakes may be a dog clutch or a dog brake. For example, C-2 may be a dog clutch.

Figures 10, 11:
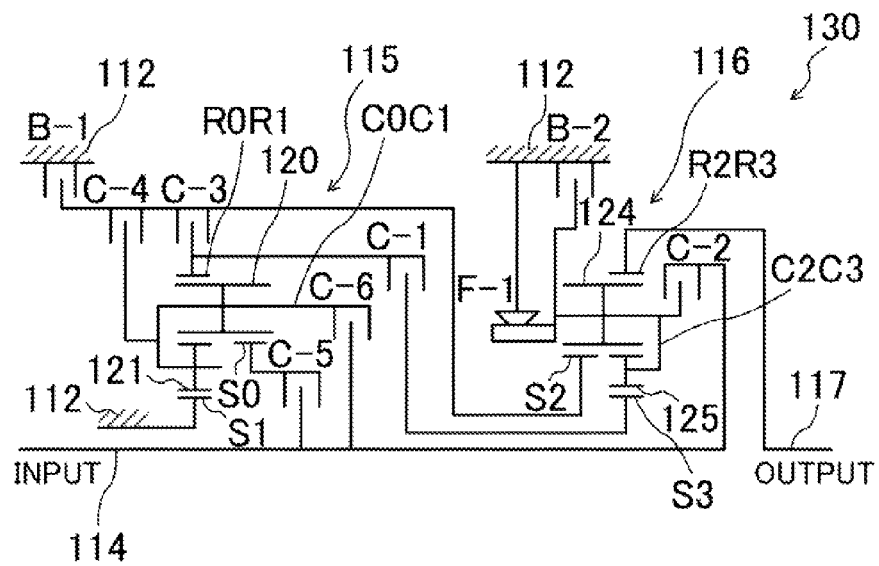
FIG. 10 is a configuration diagram schematically showing the configuration of an automatic transmission 130 of a modification.
FIG. 11 is an illustration showing an operation table of the automatic transmission 130 of the modification.

The automatic transmission apparatus 20 of the embodiment uses the automatic transmission 30 that form six forward speeds by engaging different combinations of two clutch or brake elements. However, the automatic transmission apparatus 20 of the embodiment may use an automatic transmission that form a plurality of forward speeds by engaging different combinations of three or more clutch or brake elements. In this case, during traveling through the idle coast, at least one of the three or more clutch or brake elements forming the target shift speed GS* can be engaged and the remainder of the three or more clutch or brake elements can be disengaged to bring the automatic transmission into the neutral state. In this case as well, it is preferable to engage the clutch or brake element common to the next lower or higher shift speed. FIG. 10 is a configuration diagram schematically showing the configuration of an automatic transmission 130 of a modification which forms ten forward speeds by engaging three clutch or brake elements. FIG. 11 is an operation table of the automatic transmission 130 of the modification.

The automatic transmission 130 shown in FIG. 10 is formed by an input shaft 114 connected to the engine side, a speed reduction compound planetary gear 115, a shift compound planetary gear 116, an output shaft 117 connected to the drive wheel side, clutches C-1, C-2, C-3, C-4, C-5, C-6, brakes B-1, B-2, a one-way clutch F-1, etc. The speed reduction double planetary gear 115 is formed by a speed reduction common carrier C0C1 rotatably supporting a long pinion 120 and a pinion 121 that mesh with each other, a first sun gear S0 meshing with the long pinion 120, a second sun gear S1 meshing with the pinion 121, and a speed reduction common ring gear R0R1 meshing with the long pinion 120. The shift double planetary gear 116 is formed by a shift common carrier C2C3 rotatably supporting a long pinion 124 and a pinion 125 that mesh with each other, a third sun gear S2 meshing with the long pinion 124, a fourth sun gear S3 meshing with the pinion 125, and a shift common ring gear R2R3 meshing with the long pinion 124. In the speed reduction double planetary gear 115, the first sun gear S0 can be coupled to the input shaft 114 via the clutch C-5, and the second sun gear S1 is fixed to a transmission case 112. The speed reduction common carrier C0C1 can be coupled to the input shaft 114 via the clutch C-6. The third sun gear S2 of the shift double planetary gear 116 is selectively coupled to the speed reduction common carrier C0C1 of the speed reduction double planetary gear 115 via the clutch C-4, is selectively coupled to the speed reduction common ring gear R0R1 via the clutch C-3, and is selectively held stationary via the brake B-1. The shift common carrier C2C3 is selectively coupled to the input shaft 114 via the clutch C-2, is selectively held stationary via the brake B-2, and is coupled to the transmission case 112 via the one-way clutch F-1, which is disposed in parallel with the brake B-2, so that reverse rotation is prevented. The fourth sun gear S3 is selectively coupled to the speed reduction common ring gear R0R1 via the clutch C-1. The shift common ring gear R2R3 is directly coupled to the output shaft 117. The automatic transmission apparatus 120 configured as described above can form shift speeds of ten forward speeds and four reverse speeds by selectively engaging the clutches C-1 to C-6, selectively engaging the brakes B-1, B-2, and selectively coupling or holding stationary each element of the input shaft 114, the output shaft 117, the speed reduction double planetary gear 115, and the shift double planetary gear 116. In the operation table of FIG. 11, a symbol "◯" in the boxes corresponding to various shift speeds of the clutches C-1 to C-6, the brakes B-1, B-2, and the one-way clutch F-1 means that a clutch is engaged and is in a coupled state, or a brake is engaged and is in a stationary state. A symbol "◯" represents the state where the oil pressure is supplied to the hydraulic servo in preparation for shifting so that shifting is smoothly carried out, but the clutch does not transfer any torque. A symbol "●" represents the state where the brake is engaged when the engine brake is in operation.

In the case where the shift control routine shown in FIG. 6 is executed by the automatic transmission apparatus of the modification including the automatic transmission 130 shown in FIGS. 10 and 11, it need only be determined in step S160 if the target shift speed GS* is any of the first to fifth speeds instead of determining if the target shift speed GS* is any of the first to third speeds. That is, if it is determined in step S120 that the idle coast execution flag F is the value 0, and it is determined in step S130 that the predetermined time has passed with both the accelerator operation amount Acc and the brake pedal position BP being kept at the value 0, it is determined that the idle coast should be executed. Thus, the value 1 is set to the idle coast execution flag F (step S140), and the target shift speed GS* is checked (step S160). If the target shift speed GS* is any of the first to fifth speeds, the clutch C-1 is switched on, and the other clutches C-2, C-3, C-4, C-5, C-6 and the brakes B-1, B-2 are switched off (step S170), whereby the routine is terminated. In order to form one of the first to fifth speeds as the shift speed of the automatic transmission 130, it is necessary to switch on the clutch C-1 and to switch on predetermined ones of the brakes and clutches, namely those predetermined for each shift speed (e.g., the brake B-1 and the clutch C-5 when forming the second speed). However, since the clutch C-1 is switched on, but all of the brakes B-2, B-1 and the clutches C-3, C-4, C-5, C-6 are switched off, none of the first to fifth speeds is formed, whereby the automatic transmission 130 is brought into the neutral state. Accordingly, the vehicle travels through inertia, namely travels through the idle coast thereafter. Since the accelerator operation amount Acc is equal to the value 0 and the automatic transmission 130 is in the neutral state, the engine 12 is idled by idling control. Unlike the case where the shift position SP of the shift lever 91 is switched to the neutral position (N position), in the neutral state obtained by switching on the clutch C-1, any of the first to fifth speeds can be immediately formed by switching on predetermined ones of the brake B-2, the brake B-1, and the clutches C-3, C-4, C-5, C-6 to be switched on, namely those predetermined for each shift speed, because the clutch C-1 is on. That is, the automatic transmission 130 is in such a neutral state that the automatic transmission 130 is ready to form any of the first to fifth speeds as the target shift speed GS* (the clutch C-1 is on).

On the other hand, if it is determined in step S160 that the target shift speed GS* is the sixth or higher speed, the clutch C-2 is switched on, and the other clutches C-1, C-3, C-4, C-5, C-6 and the brake B-1 are switched off (step S180), whereby the routine is terminated. In the operation table of FIG. 11, in order to form one of the sixth and higher speeds as the shift speed of the automatic transmission 130, it is necessary to switch on the clutch C-2, and to switch on predetermined ones of the clutches C-1, C-3, C-4, C-5, C-6 and the brake B-1, namely those predetermined for each shift speed (e.g., the clutch C-4 and the clutch C-6 when forming the seventh speed). However, since the clutch C-2 is switched on, but all of the other clutches C-1, C-3, C-4, C-5, C-6 and the brake B-1 are switched off, none of the sixth and higher speeds is formed, whereby the automatic transmission 130 is brought into the neutral state. Accordingly, the vehicle travels through the idle coast thereafter. In this case as well, since the accelerator operation amount Acc is equal to the value 0 and the automatic transmission 130 is in the neutral state, the engine 12 is idled by idling control. Unlike the case where the shift position SP of the shift lever 91 is switched to the neutral position (N position), in the neutral state obtained by switching on the clutch C-2, any of the sixth and higher speeds can be immediately formed by switching predetermined ones of the clutches C-1, C-3, C-4, C-5, C-6 and the brake B-1, namely those predetermined for each shift speed, because the clutch C-2 is on, as in the case of the above neutral state obtained by switching on the clutch C-1. That is, the automatic transmission 130 is in such a neutral state that the automatic transmission 130 is ready to form any of the sixth and higher speeds as the target shift speed GS* (the clutch C-2 is on).

If the target shift speed GS* is any of the first to fifth speeds, the clutch C-1 is switched on, and the other clutches C-2, C-3, C-4, C-5, C-6 and the brakes B-1, B-2 are switched off (step S170), whereby the routine is terminated. If the target shift speed GS* is any of the third to fifth speeds, not only the clutch C-1 but also the clutch C-6 may be engaged, and all of the other clutches and the brakes may be disengaged. In this case, if the driver steps on the accelerator pedal 93 during traveling through the idle coast and the acceleration operation amount Acc is no longer equal to the value 0, or if the driver steps on the brake pedal 93 during traveling through the idle coast and the brake pedal position BP is no longer equal to the value 0, it is determined in step S150 that not both the accelerator operation amount Acc and the brake pedal position BP are kept at the value 0, and the value 0 is set to the idle coast execution flag F (step S190), and the disengaged clutch or brake is engaged so as to form the target shift speed GS* set at that time. For example, in the case where the target shift speed GS* is the third speed, restoration at the third speed as the target shift speed can be quickly carried out by merely engaging the brake B-1.

Thus, in the case where three engagement elements such as clutches and brakes are to be switched on (engaged) in order to form the target shift speed GS*, one or two of the three engagement elements to be engaged, namely at least one engagement element, need only be engaged in order to attain the neutral state through the idle coast. Moreover, although not shown in the figure, in the case where four engagement elements such as clutches and brakes are to be switched on (engaged) in order to form the target shift speed GS*, one, two, or three of the four engagement elements to be engaged, namely at least one engagement element, need only be engaged in order to attain the neutral state through the idle coast. That is, if "n" engagement elements such as clutches and brakes are to be switched on (engaged) in order to form the target shift speed GS*, one to (n−1) of the "n" engagement elements to be engaged, namely at least one engagement element, need only be engaged in order to attain the neutral state through the idle coast.

In the automatic transmission apparatus 20 of the embodiment and the modification thereof, the clutch or brake, which is common to the clutches or brakes to be switched on to form the shift speed that is one shift speed lower than the target shift speed GS* or to form the shift speed that is one shift speed higher than the target shift speed GS*, out of the clutches and brakes to be switched on (engaged) to form the target shift speed GS*, (in the embodiment, the clutch C-1 when forming any of the first to third speeds, and the clutch C-2 when forming any of the fourth to sixth speeds, and in the modification, the clutch C-1 when forming any of the first to fifth speeds and the clutch C-2 when forming the sixth or higher speed) is switched on to attain the neutral state through the idle coast. However, the clutch or brake, which is not common to the clutches or brakes to be switched on to form the shift speed that is one shift speed lower than the target shift speed GS* or to form the shift speed that is one shift speed higher than the target shift speed GS*, may be switched on to attain the neutral state through the idle coast.

Although the present invention is applied in the form of the automatic transmission apparatus 20 in the embodiment, the present invention may be applied in the form of the control apparatus for the transmission, or in the form of the control method for the transmission.

Correspondence between the primary elements of the embodiment and the primary elements of the invention described in "SUMMARY OF THE INVENTION" will be described below. In the embodiment, the automatic transmission 30 corresponds to the "transmission." The transmission ECU 80 that performs step S110 of the shift control routine of FIG. 6, namely the step of applying the acceleration operation amount Acc and the vehicle speed V to the shift map to set the target shift speed GS*, corresponds to the "target shift speed changing unit." The transmission ECU 80 that performs steps S130, S160 to S180 of the shift control routine of FIG. 6, namely the steps of, when the predetermined time has passed with both the accelerator operation amount Acc and the brake pedal position BP being kept at the value 0 during traveling with the shift position SP being the D position, engaging the common clutch C-1 out of the clutch and the brake required to form any of the first to third speeds, thereby bringing the automatic transmission 30 into the neutral state if the target shift speed GS* is any of the first to third speeds, and engaging the common clutch C-2 out of the clutch and the brake required to form any of the fourth to sixth speeds, thereby bringing the automatic transmission 30 into the neutral state if the target shift speed GS* is any of the fourth to sixth speeds, corresponds to the "neutral control unit."

The correspondence between the primary elements of the embodiment and the primary elements of the invention described in "SUMMARY OF THE INVENTION" is shown by way of example to specifically describe the mode in which the embodiment carries out the invention described in "SUMMARY OF THE INVENTION." Thus, this correspondence is not intended to limit the elements of the invention described in "SUMMARY OF THE INVENTION." That is, the invention described in "SUMMARY OF THE INVENTION" should be construed based on the description therein, and the embodiment is merely a specific example of the invention described in "SUMMARY OF THE INVENTION."

Although the mode for carrying out the invention is described above based on the embodiment, it should be understood that the present invention is not limited in any way to such an embodiment, and the present invention can be carried out in various forms without departing from the spirit and scope of the present invention.

The present invention can be used in the manufacturing industry of automatic transmission apparatuses, etc.

The invention claimed is:

1. An automobile transmission for a vehicle comprising:
   a transmission configured to achieve a plurality of shift speeds by engaging a combination of necessary engagement elements of a plurality of engagement elements, the combination of necessary engagement elements being a unique combination of at least two of the plurality of engagement elements for each of the plurality of shift speeds;
   the plurality of shift speeds including:
      a lowest shift speed;
      a highest shift speed;
      a first predetermined shift speed between the lowest shift speed and the highest shift speed;
      a second predetermined shift speed that is one shift speed lower than the first predetermined shift speed; and
      a third predetermined shift speed that is one shift speed higher than the first predetermined shift speed;
   the combination of necessary engagement elements of the first predetermined shift speed or lower include engagement of at least a first engagement element; and
   the combination of necessary engagement elements of the first predetermined shift speed or higher include engagement of at least a second engagement element that is different from the first engagement element; and
   a transmission controller configured to control shifting of the transmission such that the transmission controller:
      sets a target shift speed based on the vehicles speed; and
      sets a neutral state of the transmission during travel, torque not being transmitted to the wheels during the neutral state:
         engaging a part of the necessary engagement elements required for the target shift speed;
         disengaging a remainder of the necessary engagement elements required for the target shift speed, thereby bringing the transmission into the neutral state, wherein:
            (i) when the set target shift speed is the second predetermined shift speed or lower, the transmission controller engages at least the first engagement element as the part of the necessary engagement elements when in the neutral state;
            (ii) when the set target shift speed is the first predetermined shift speed, the transmission controller engages at least one of the first engagement element and the second engagement element as the part of the necessary engagement elements when in the neutral state; and
            (iii) when the set target shift speed is the third predetermined shift speed or higher, the transmission controller engages at least the second engagement element as the part of the necessary engagement elements when in the neutral state.

2. The automobile transmission according to claim 1, wherein the transmission controller is configured to adjust the target shift speed based on a change of the vehicle speed, and adjust which engagement elements are part of the necessary engagement elements based on the adjusted target shift speed.

3. The automobile transmission according to claim 1, wherein, the controller sets the neutral state during travel when the transmission is configured in a forward or reverse shift speed, an accelerator is off, and a brake is off.

4. The automobile transmission according to claim 1, wherein, the transmission controller is configured to idle an engine connected to the transmission when the transmission is brought into the neutral state.

5. The automobile transmission according to claim 1, wherein the second predetermined shift speed is the lowest shift speed.

6. The automobile transmission according to claim 1, wherein the third predetermined shift speed is the highest shift speed.

7. The automobile transmission according to claim 1, wherein, when the set target shift speed is the first predetermined shift speed, the transmission controller engages both the first and second engagement elements as the part of the necessary engagement elements when in the neutral state.

8. The automobile transmission according to claim 1, wherein when the set target shift speed is the second predetermined shift speed or lower, the transmission controller always engages at least the first engagement element as the part of the necessary engagement elements when in the neutral state.

9. The automobile transmission according to claim 1, wherein the combination of necessary engagement elements includes at least three engagement elements, and when the set target shift speed is the first predetermined shift speed, the transmission controller: (i) engages at least one of the first and second engagement elements as the part of the necessary engagement elements when in the neutral state, and (ii) disengages a remainder of the necessary engagement elements required for the target shift speed, thereby bringing the transmission into the neutral state.

10. The automobile transmission according to claim 1, wherein the combination of necessary engagement elements includes at least two engagement elements, and when the set target shift speed is the first predetermined shift speed, the transmission controller: (i) engages only one of the first and second engagement elements as the part of the necessary engagement elements when in the neutral state, and (ii) disengages a remainder of the necessary engagement elements required for the target shift speed, thereby bringing the transmission into the neutral state.

* * * * *